United States Patent
Wu

(10) Patent No.: US 9,128,900 B2
(45) Date of Patent: Sep. 8, 2015

(54) METHOD AND SERVER FOR MANAGING REDUNDANT ARRAYS OF INDEPENDENT DISKS CARDS

(71) Applicant: HON HAI PRECISION INDUSTRY CO., LTD., New Taipei (TW)

(72) Inventor: Chih-Huang Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 261 days.

(21) Appl. No.: 13/858,030

(22) Filed: Apr. 6, 2013

(65) Prior Publication Data

US 2014/0082245 A1 Mar. 20, 2014

(30) Foreign Application Priority Data

Sep. 17, 2012 (TW) .............................. 101133917 A

(51) Int. Cl.
*G06F 3/06* (2006.01)
*G06F 11/20* (2006.01)
(Continued)

(52) U.S. Cl.
CPC ............ *G06F 11/2089* (2013.01); *G06F 3/061* (2013.01); *G06F 3/0601* (2013.01); *G06F 3/067* (2013.01); *G06F 3/0613* (2013.01); *G06F 3/0635* (2013.01); *G06F 3/0689* (2013.01); *G06F 11/201* (2013.01); *G06F 11/2005* (2013.01); *G06F 11/2066* (2013.01); *G06F 13/40* (2013.01); *G06F 13/4068* (2013.01); *G06F 13/4221* (2013.01); *H04L 12/40013* (2013.01); *H04L 43/0876* (2013.01);
(Continued)

(58) Field of Classification Search
CPC ............ H04L 67/1002; H04L 67/1097; H04L 67/1008; H04L 67/101; H04L 69/40; H04L 47/10; H04L 47/125; H04L 47/6255; H04L 41/0803; H04L 45/24; H04L 49/50; H04L 43/0876; G06F 3/0613; G06F 3/067; G06F 3/0689; G06F 3/061; G06F 3/0635; G06F 3/0601; G06F 3/0617; G06F 3/0614; G06F 3/0634; G06F 3/0632; G06F 2211/103; G06F 2211/1004; G06F 2211/1045; G06F 11/201; G06F 11/2089; G06F 11/2005; G06F 11/2097; G06F 11/2069; G06F 11/2066; G06F 11/008; G06F 11/2033; G06F 9/505; G06F 9/5088; G06F 2003/0692; G06F 17/30197; G06F 2212/262; G06F 2213/0026; G06F 13/4221

See application file for complete search history.

(56) References Cited

U.S. PATENT DOCUMENTS 5,937,428 A * 8/1999 Jantz .............................. 711/114
6,237,063 B1 * 5/2001 Bachmat et al. .............. 711/114

(Continued)

*Primary Examiner* — Ryan Stiglic
(74) *Attorney, Agent, or Firm* — Novak Druce Connolly Bove + Quigg LLP

(57) ABSTRACT

In a method for managing redundant arrays of independent disks (RAID) cards and a server for executing the method, the server calculates a theoretical percentage of a load of each RAID card according to a number of the RAID cards, and loads an actual percentage of the load of each RAID card through a multi input output (MIO) interface, and detects peripheral component interconnect-express (PCI-E) bandwidth of each RAID card. When the load of each RAID card is unbalanced or the PCI-E bandwidth of the RAID card is saturated, the server transfers the load from a RAID card having a greater actual percentage of the load into a RAID card having a less actual percentage of the load, and transfers the load from a RAID card whose PCI-E bandwidth is saturated into a RAID card whose PCI-E bandwidth is unsaturated according to differential signals through the MIO interface.

18 Claims, 3 Drawing Sheets

(51) Int. Cl.
*G06F 13/42* (2006.01)
*H04L 29/08* (2006.01)
*H04L 12/803* (2013.01)
*G06F 13/40* (2006.01)
*H04L 12/707* (2013.01)
*H04L 12/26* (2006.01)
*H04L 12/40* (2006.01)
*H04L 12/863* (2013.01)
*H04L 12/801* (2013.01)
*G06F 9/50* (2006.01)
*G06F 11/10* (2006.01)

(52) U.S. Cl.
CPC ............ *H04L45/24* (2013.01); *H04L 47/6255*
(2013.01); *H04L 67/1097* (2013.01); *G06F*
*9/505* (2013.01); *G06F 9/5088* (2013.01);
*G06F 11/1076* (2013.01); *G06F 2206/1012*
(2013.01); *G06F 2212/262* (2013.01); *G06F*
*2213/0026* (2013.01); *H04L 47/10* (2013.01);
*H04L 47/125* (2013.01); *H04L 67/101*
(2013.01); *H04L 67/1002* (2013.01); *H04L*
*67/1008* (2013.01)

(56) References Cited

U.S. PATENT DOCUMENTS

| | | | |
|---|---|---|---|
| 6,654,831 B1* | 11/2003 | Otterness et al. | 710/74 |
| 6,904,477 B2* | 6/2005 | Padmanabhan et al. | 710/74 |
| 7,577,158 B2* | 8/2009 | Aoki et al. | 370/412 |
| 7,721,150 B2* | 5/2010 | Belyakov et al. | 714/16 |
| 7,760,626 B2* | 7/2010 | Malpani et al. | 370/230 |
| 7,992,039 B2* | 8/2011 | Belyakov et al. | 714/16 |
| 8,036,238 B2* | 10/2011 | Aoki et al. | 370/412 |
| 8,429,452 B2* | 4/2013 | Belyakov et al. | 714/16 |
| 8,930,592 B2* | 1/2015 | Zhou et al. | 710/38 |
| 8,972,657 B1* | 3/2015 | Armangau et al. | 711/114 |
| 2004/0107300 A1* | 6/2004 | Padmanabhan et al. | 710/1 |
| 2005/0259632 A1* | 11/2005 | Malpani et al. | 370/351 |
| 2006/0020691 A1* | 1/2006 | Patterson et al. | 709/223 |
| 2006/0092828 A1* | 5/2006 | Aoki et al. | 370/216 |
| 2008/0222661 A1* | 9/2008 | Belyakov et al. | 719/321 |
| 2009/0271541 A1* | 10/2009 | Aoki et al. | 710/38 |
| 2010/0157806 A1* | 6/2010 | Song et al. | 370/236 |
| 2010/0185794 A1* | 7/2010 | Belyakov et al. | 710/38 |
| 2011/0258484 A1* | 10/2011 | Belyakov et al. | 714/4.11 |

* cited by examiner

METHOD AND SERVER FOR MANAGING REDUNDANT ARRAYS OF INDEPENDENT DISKS CARDS

BACKGROUND

1. Technical Field

The present disclosure is related to a server and a method for managing redundant arrays of independent disks (RAID) cards.

2. Description of Related Art

In cloud computing, mainframes have many storage devices where the hard disks are configured as redundant arrays of independent disks (RAID) that can be used by users. Computing capability of a RAID card and peripheral component interconnect-express bandwidth cannot simultaneously handle a large number of requests.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present embodiments.

DETAILED DESCRIPTION

In general, the word "module," as used herein, refers to logic embodied in hardware or firmware, or to a collection of software instructions, written in a programming language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable storage medium or other storage device. Some non-limiting examples of non-transitory computer-readable storage medium include CDs, DVDs, flash memory, and hard disk drives.

Figure 1:
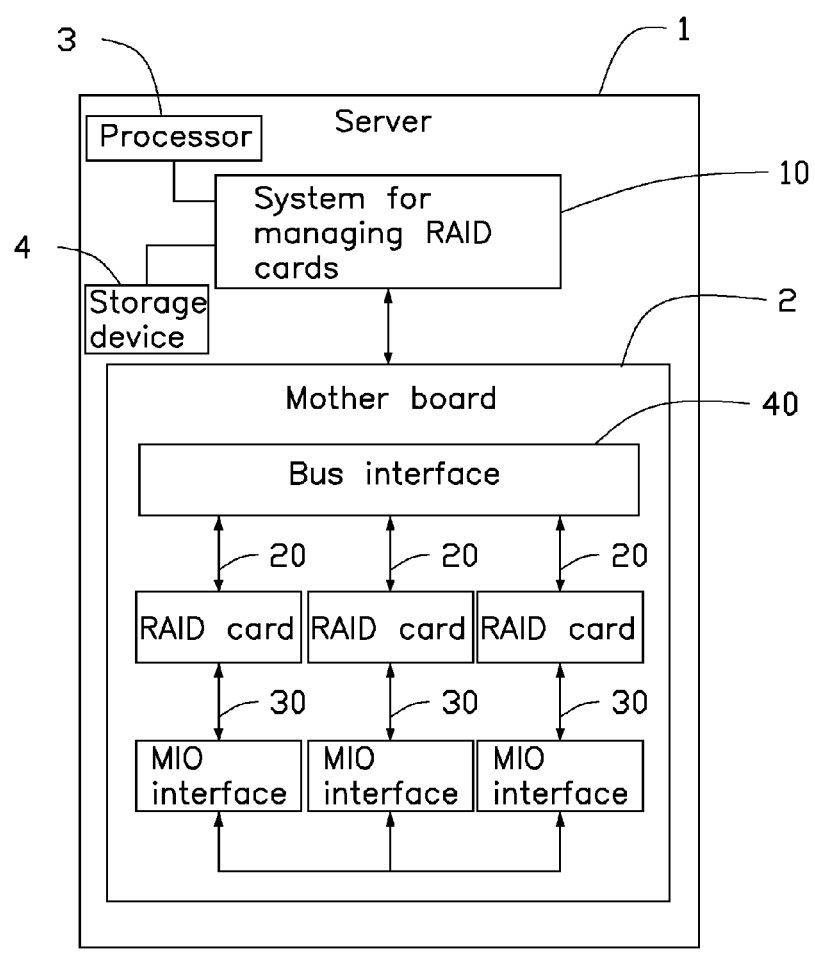
FIG. 1 is a schematic diagram of one embodiment of a server for managing redundant arrays of independent disks cards.

FIG. 1 is a schematic diagram of one embodiment of a server 1 for managing redundant arrays of independent disks (RAID) cards. The server 1 comprises a system 10 that manages RAID cards. The server 1 further includes a motherboard 2, a processor 3, and a storage device 4. The motherboard 2 comprises one or more RAID cards 20. The RAID card 20 is connected with a bus interface 40. In the embodiment, the bus interface 40 is a peripheral component interconnect-express (PCI-E) interface.

Furthermore, each of the RAID cards 20 corresponds to a multi input output (MIO) interface 30. The RAID cards 20 and MIO interface 30 are serially connected by a flat cable or connecting method to communicate with each other and to separate loads of the RAID cards 20.

Figure 2:
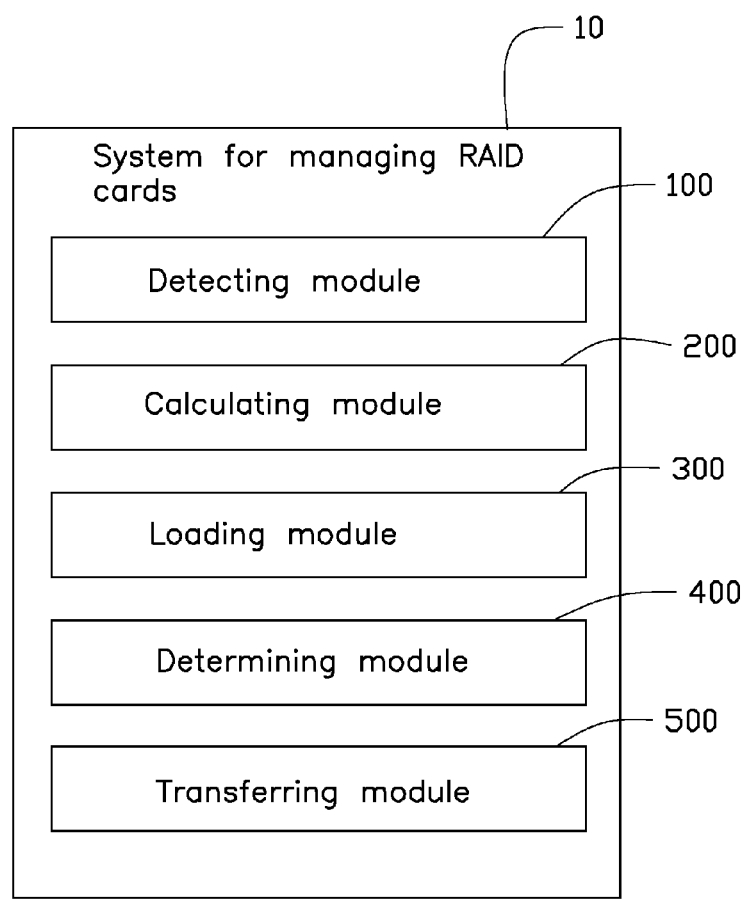
FIG. 2 is a block diagram of functional modules of a system for managing redundant arrays of independent disks cards.

FIG. 2 is a block diagram of functional modules of the system 10 for managing the RAID cards 20.

The system 10 includes a detecting module 100, a calculating module 200, a loading module 300, a determining module 400, and a transferring module 500. The modules may include computerized instructions in the form of one or more programs that are stored in the storage device 4 and executed by the at least one processor 3.

The detecting module 100 detects a number of the RAID cards 20 of the motherboard 2.

The calculating module 200 calculates a theoretical percentage of a load of each RAID card 20 according to the number of the RAID cards 20. In the embodiment, the calculating module 200 further obtains the theoretical percentage of the load of each RAID card 20 according to dividing one hundred percent by the number of the RAID cards 20. For example, when the number of the RAID cards 20 is four, the theoretical percentage of the load of the RAID cards 20 can be calculated as twenty-five percent.

The loading module 300 loads an actual percentage of the load of each RAID card 20 through the MIO interface 30, and detects a PCI-E bandwidth of each RAID card 20 through the MIO interface 30. The MIO interface 30 includes an inter-integrated circuit (I2C) interface that coordinates the load of each RAID card 20 and the PCI-E bandwidth. The loading module 300 obtains the PCI-E bandwidth and the load of the RAID cards 20 from the RAID cards 20 through the I2C interface.

The determining module 400 determines whether the load of each RAID card 20 is balanced and whether the PCI-E bandwidth of each RAID card 20 is saturated. The load of each RAID card 20 being balanced indicates that a difference between the actual percentage and the theoretical percentage is in a preset tolerance range. The PCI-E bandwidth being saturated indicates that the PCI-E bandwidth is at a maximum flow. The PCI-E bandwidth being unsaturated indicates that the PCI-E bandwidth is not at the maximum flow. The preset tolerance range includes a first threshold value and a second threshold value. The first threshold value is a minimum of the preset tolerance range, and the second threshold value is a maximum of the preset tolerance range. When the difference between the actual percentage and the theoretical percentage of the load of the RAID card 20 is between the first threshold value and the second threshold value, the difference is in the preset tolerance range. For example, the first threshold value is minus five percent, and the second threshold value is five percent. When the difference between the actual percentage and the theoretical percentage is one percent, which is between minus five percent and five percent, in one example, the difference is in the preset tolerance range.

When the load of each RAID card 20 is unbalanced, the transferring module 500 transfers the load from a RAID card 20 having a greater actual percentage of the load into a RAID card 20 having a less actual percentage of the load according to differential signals through the MIO interface 30 until the load of each RAID card 20 is balanced. In the embodiment, the difference on the low side indicates that the difference is less than the first threshold value. The difference on the high side indicates that the difference is greater than the second threshold value.

The transferring module 500 further transfers the load from a RAID card 20 whose PCI-E bandwidth is saturated into a RAID card 20 whose PCI-E bandwidth is unsaturated according to the differential signals through the MIO interface 30 when one of the PCI-E bandwidth of the RAID card 20 is saturated. The differential signals are signals for transferring the load between the MIO interface 30 and the RAID cards 20.

The load of the RAID card 20 being balanced in the following example indicates that the actual percentage is equal to the theoretical percentage, and indicates that the difference is zero percent. For example, when the motherboard 2 comprises one RAID card 20, the MIO interface 30 corresponding to the RAID card 20 is connected with nothing, and the RAID card 20 will load one hundred percent of the load.

For example, when the mother board 2 comprises two RAID cards 20, the two MIO interfaces 30 corresponding to the two RAID cards 20 are connected with each other. The calculating module 200 calculates the theoretical percentage of the load of each RAID card 20 by dividing one hundred percent by two, fifty percent, and the loading module 300 loads the actual percentage of the load of each RAID card 20. When the determining module 400 determines that the load of the two RAID cards 20 are unbalanced, the transferring module 500 transfers the load from a RAID card having a greater actual percentage of the load into a RAID card having a less actual percentage of the load until the load of each RAID card 20 is fifty percent.

For example, when the motherboard 2 comprises three RAID cards 20, the three MIO interfaces 30 corresponding to the three RAID cards 20 are connected with each other. The calculating module 200 calculates the theoretical percentage of the load of each RAID card 20 by dividing one hundred percent by three, thirty-three point three percent, and the loading module 300 loads the actual percentage of the load of each RAID card 20. When the determining module 400 determines that the loads of the three RAID cards 20 are unbalanced, the transferring module 500 transfers the load from a RAID card having a greater actual percentage of the load into a RAID card having a less actual percentage of the load until the load of the three RAID card are equal to thirty-three point three percent.

Figure 3:
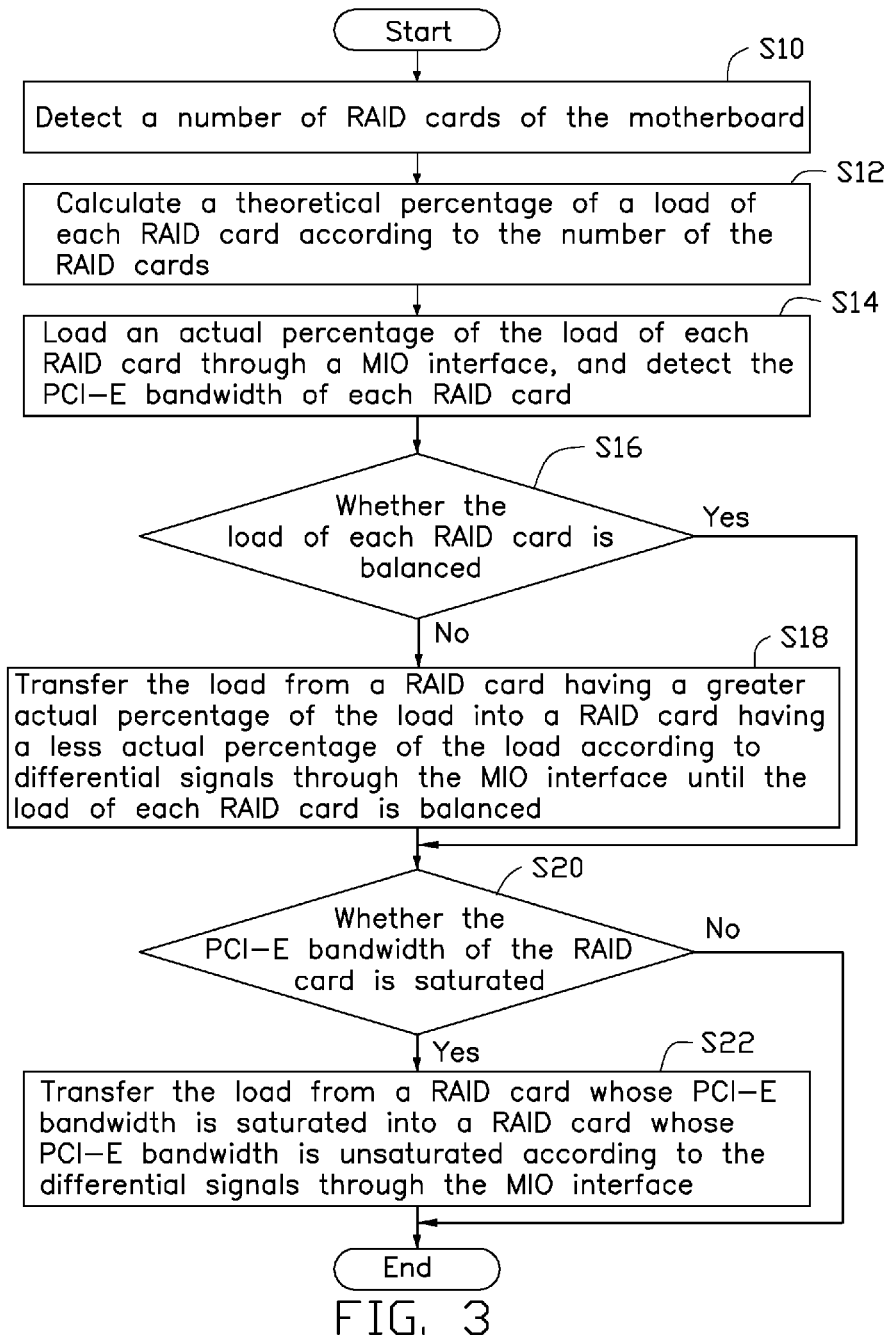
FIG. 3 is a flowchart of one embodiment of a method for managing redundant arrays of independent disks cards.

FIG. 3 is a flowchart of the embodiment of a method for managing the RAID cards 20 included in the server 1.

In step S10, the detecting module 100 detects a number of the RAID cards of the motherboard 2, and then step S12 is implemented.

In step S12, the calculating module 200 calculates the theoretical percentage of the load of each RAID card 20 according to the number of the RAID cards 20. In the embodiment, the theoretical percentage of the load of each RAID card 20 can be obtained according to a result of dividing one hundred percent by the number of the RAID cards 20, and then step S14 is implemented.

In step S14, the loading module 300 loads the actual percentage of the load of each RAID card 20 through the MIO interface 30, and detects the PCI-E bandwidth of each RAID card 20, and then step S16 is implemented.

In step S16, the determining module 400 determines whether the load of each RAID card 20 is balanced. If the load of each RAID card 20 is unbalanced, then step S18 is implemented. If the operating load of each RAID card 20 is balanced, then step S20 is implemented.

In step S18, the transferring module 500 transfers the load from a RAID card 20 having a greater actual percentage of the load into a RAID card 20 having a less actual percentage of the load according to the differential signals through the MIO interface 30 until the load of each RAID card 20 is balanced, and then step S20 is implemented.

In step S20, the determining module 400 determines whether the PCI-E bandwidth of the RAID card 20 is saturated. If one of the PCI-E bandwidth of the RAID card 20 is saturated, then step S22 is implemented. If all the PCI-E bandwidth of the RAID cards 20 is unsaturated, then the flowchart is ended.

In step S22, the transferring module 500 further transfers the load from a RAID card 20 whose PCI-E bandwidth is saturated into a RAID card 20 whose PCI-E bandwidth is unsaturated according to the differential signals through the MIO interface 30, and then the flowchart ends.

Depending on the embodiment, the method can adjust the load of each RAID card 20 and the PCI-E bandwidth through the MIO interface 30. When the PCI-E bandwidth of the RAID cards 20 is saturated or when the load of the RAID cards 20 is fully loaded, a RAID card 20 can be inserted into the motherboard 2 to add the number of the RAID cards 20. The method can automatically adjust the loads of the RAID cards and the PCI-E bandwidth of each RAID card 20, which is connected to the PCI-E. The RAID cards 20 can communicate with each other to separate the load. The method can ensure that the RAID cards 20 are normally operating, and ensure that the RAID cards 20 would not be blocked.

Depending on the embodiment, some of the steps described may be removed, others may be added, and the sequence of the steps may be altered. It is also to be understood that the description and the claims drawn to a method may include some indication in reference to certain steps. However, the indication used is only to be viewed for identification purposes and not necessarily as a suggestion as to an order for the steps.

All of the processes described above may be embodied in, and fully automated via, functional codes executed by one or more general purpose processors of computing devices. The functional codes may be stored in any type of non-transitory computer readable storage medium or other storage device. Some or all of the methods may alternatively be embodied in specialized hardware. Depending on the embodiment, the non-transitory computer readable storage medium may be a hard disk drive, a compact disc, a digital video disc, a tape drive or other suitable storage medium.

The above disclosure is the preferred embodiment. Anyone of ordinary skill in this field can modify and change the embodiment in the spirit of the present disclosure, and all such changes or modifications are to be included in the scope of the following claims.

What is claimed is:

1. A method for managing redundant arrays of independent disks (RAID) cards, the method comprising:
   detecting a number of the RAID cards of a mother board;
   calculating a theoretical percentage of a load of each RAID card according to the number of the RAID cards;
   loading an actual percentage of the load of each RAID card through a multi input output (MIO) interface, and detecting a peripheral component interconnect-express (PCI-E) bandwidth of each RAID card;
   transferring the load from a RAID card having a greater actual percentage of the load into a RAID card having a less actual percentage of the load until the load of each RAID card is balanced; and
   transferring the load from a RAID card whose PCI-E bandwidth is saturated into a RAID card whose PCI-E bandwidth is unsaturated according to differential signals through the MIO interface.

2. The method of claim 1, further comprising:
   obtaining the theoretical percentage of the load of each RAID card according to dividing one hundred percent by the number of the RAID cards.

3. The method of claim 1, further comprising:
   obtaining the PCI-E bandwidth and the load of the RAID card from the RAID card through an inter-integrated circuit (I2C) interface of the MIO interface.

4. The method of claim 1, wherein the load of the RAID card being balanced indicates that a difference between the actual percentage and the theoretical percentage is in a preset tolerance range, and the PCI-E bandwidth being saturated indicates that the PCI-E bandwidth is at maximum flow, and the PCI-E bandwidth being unsaturated indicates that the PCI-E bandwidth is not at the maximum flow.

5. The method of claim 4, wherein the difference between the actual percentage and the theoretical percentage on the low side indicates that the difference is less than a first threshold value, and the first threshold value is a minimum of the preset tolerance range.

6. The method of claim 4, wherein the difference between the actual percentage and the theoretical percentage on the high side indicates that the difference is greater than a second threshold value, and the second threshold value is a maximum of the preset tolerance range.

7. A server for managing redundant arrays of independent disks (RAID) cards, the server comprising:
a storage device;
at least one processor; and
one or more modules stored in the storage device and executed by the at least one processor, the one or more modules comprising:
a detecting module that detects a number of the RAID cards of a mother board;
a calculating module that calculates a theoretical percentage of a load of each RAID card according to the number of the RAID cards;
a loading module that loads an actual percentage of the load of each RAID card through a multi input output (MIO) interface, and detect peripheral component interconnect-express (PCI-E) bandwidth of each RAID card; and
a transferring module that transfers the load from a RAID card having a greater actual percentage of the load into a RAID card having a less actual percentage of the load until the load of each RAID card is balanced, and transfers the load from a RAID card whose PCI-E bandwidth is saturated into a RAID card whose PCI-E bandwidth is unsaturated according to differential signals through the MIO interface.

8. The server of claim 7, wherein the calculating module obtains the theoretical percentage of the load of each RAID card according to dividing one hundred percent by the number of the RAID cards.

9. The server of claim 7, wherein the loading module obtains the PCI-E bandwidth and the load of the RAID card from the RAID card through an I2C interface of the MIO interface.

10. The server of claim 7, wherein the load of the RAID card being balanced indicates that a difference between the actual percentage and the theoretical percentage is in a preset tolerance range, and the PCI-E bandwidth being saturated indicates that the PCI-E bandwidth is at maximum flow, and the PCI-E bandwidth being unsaturated indicates that the PCI-E bandwidth is not at the maximum flow.

11. The server of claim 10, wherein the difference between the actual percentage and the theoretical percentage on the low side indicates that the difference is less than a first threshold value, and the first threshold value is a minimum of the preset tolerance range.

12. The server of claim 10, wherein the difference between the actual percentage and the theoretical percentage on the high side indicates that the difference is greater than a second threshold value, and the second threshold value is a maximum of the preset tolerance range.

13. A non-transitory computer-readable storage medium having stored thereon instructions that, when executed by at least one processor of a server, causes the server to perform a method for managing redundant arrays of independent disks (RAID) cards, the method comprising:
detecting a number of the RAID cards of a mother board;
calculating a theoretical percentage of a load of each RAID card according to the number of the RAID cards;
loading an actual percentage of the load of each RAID card through a multi input output (MIO) interface, and detecting peripheral component interconnect-express (PCI-E) bandwidth of each RAID card;
transferring the load from a RAID card having a greater actual percentage of the load into a RAID card having a less actual percentage of the load until the load of each RAID card is balanced; and
transferring the load from a RAID card whose PCI-E bandwidth is saturated into a RAID card whose PCI-E bandwidth is unsaturated according to differential signals through the MIO interface.

14. The storage medium of claim 13, wherein the method further comprises:
obtaining the theoretical percentage of the load of each RAID card according to dividing one hundred percent by the number of the RAID cards.

15. The storage medium of claim 13, wherein the method further comprises:
obtaining the PCI-E bandwidth and the load of the RAID card from the RAID card through an inter-integrated circuit (I2C) interface of the MIO interface.

16. The storage medium of claim 13, wherein the load of the RAID card being balanced indicates that a difference between the actual percentage and the theoretical percentage is in a preset tolerance range, and the PCI-E bandwidth being saturated indicates that the PCI-E bandwidth is at maximum flow, and the PCI-E bandwidth being unsaturated indicates that the PCI-E bandwidth is not at the maximum flow.

17. The storage medium of claim 16, wherein the difference between the actual percentage and the theoretical percentage on the low side indicates that the difference is less than a first threshold value, and the first threshold value is a minimum of the preset tolerance range.

18. The storage medium of claim 16, wherein the difference between the actual percentage and the theoretical percentage on the high side indicates that the difference is greater than a second threshold value, and the second threshold value is a maximum of the preset tolerance range.

* * * * *